(No Model.) 2 Sheets—Sheet 1.
C. E. W. WOODWARD.
METHOD OF MAKING JOINTS IN PNEUMATIC TIRES.
No. 528,056. Patented Oct. 23, 1894.
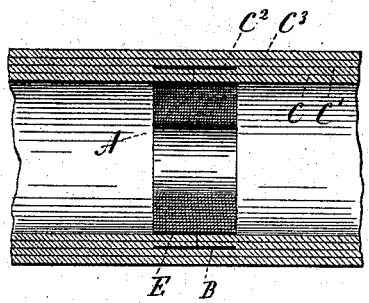
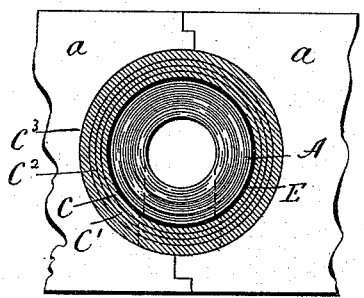
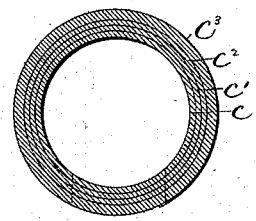
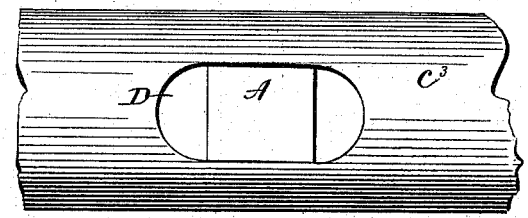
Witnesses
J. H. Shumway
Lillian D. Kelley
Charles E. W. Woodward
Inventor
By atty
Earle & Seymour (No Model.)  2 Sheets—Sheet 2.

C. E. W. WOODWARD.
METHOD OF MAKING JOINTS IN PNEUMATIC TIRES.

No. 528,056. Patented Oct. 23, 1894.

Witnesses
J. H. Shumway
Lillian D. Kelley

Charles E. W. Woodward,
Inventor
By atty
Earle Seymour

UNITED STATES PATENT OFFICE.

CHARLES E. W. WOODWARD, OF CHICOPEE FALLS, MASSACHUSETTS, ASSIGNOR TO THE OVERMAN WHEEL COMPANY, OF SAME PLACE, AND HARTFORD, CONNECTICUT.

METHOD OF MAKING JOINTS IN PNEUMATIC TIRES.

SPECIFICATION forming part of Letters Patent No. 528,056, dated October 23, 1894.

Application filed May 8, 1893. Serial No. 473,338. (No specimens.)

*To all whom it may concern:*

Be it known that I, CHARLES E. W. WOODWARD, of Chicopee Falls, in the county of Hampden and State of Massachusetts, have invented a new Improvement in Methods of Making Pneumatic Cycle-Tires and Kindred Hollow Articles; and I do hereby declare the following, when taken in connection with accompanying drawings and the letters of reference marked thereon, to be a full, clear, and exact description of the same, and which said drawings constitute part of this specification, and represent, in—

Figure 5:
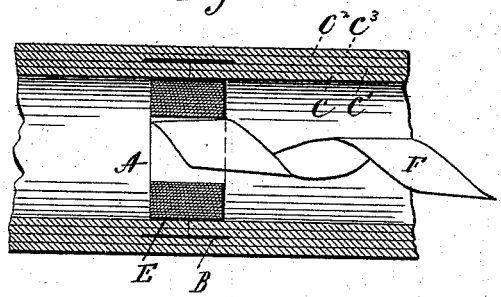
Figure 6:
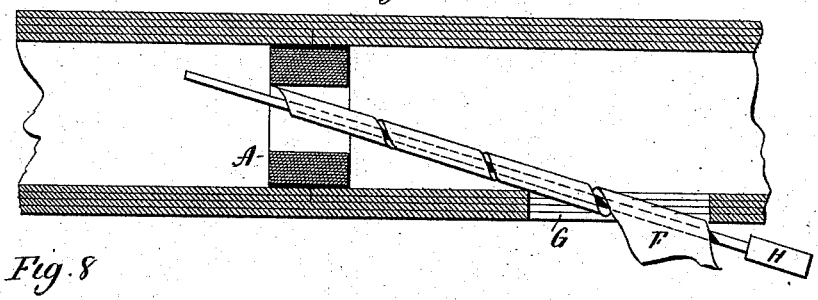
Figure 8:
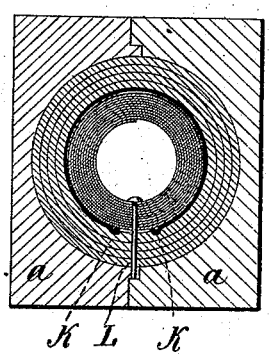
Figure 7:
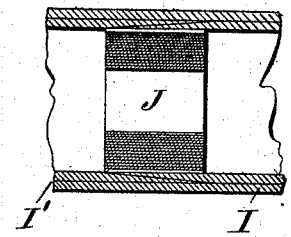

Figure 1, a broken view in central longitudinal section, of a pneumatic cycle-tire having its ends reduced and abutted over a core, preparatory to being molded and vulcanized; Fig. 2, a view in transverse section of the tire, the core and the mold; Fig. 3, a reverse plan view of the tire after it has been removed from the mold, and having an opening or port formed in its inner periphery for the introduction and removal of an inner air-tube, which is not shown, the core being seen through the said opening, which incidentally provides for its removal from the tire; Fig. 4, a view in transverse section of the tire after the core has been removed; Fig. 5, a broken view in central longitudinal section of a tire having its ends abutted over a core, the inner end of which is drawn out so that it may be caught for removing the core from the tire in the form of a tape, through a small opening formed at one side of the joint in the tire, which in this case is not designed to have a port formed in it; Fig. 6, a similar view showing the same core in the process of removal; Fig. 7, a view showing the lapping of the ends of a tire over a core; Fig. 8, a view in transverse section through a tire and a core in a mold, and showing the rolling of the ends of a transverse strip to form beads.

My invention relates to an improved method of forming the joints of pneumatic cycle-tires, the object being to facilitate their production, and to secure an article of superior strength and quality.

Although my invention is particularly adapted to the production of cycle-tires, it may also be used in making other hollow articles composed of, or containing rubber, and requiring molding and vulcanizing.

With these ends in view, my invention comprehends a method of forming joints in hollow articles, composed of or containing rubber, and consisting in placing a tape core within the joint of the thing being formed, then subjecting the same to internal pressure in a mold which co-operates with the core to place the material between them under mechanical compression, and then reducing and removing the core by unwinding and withdrawing it.

My invention further consists in certain other steps as will be hereinafter described and pointed out in the claims.

In carrying out my invention, as illustrated in Figs. 1 to 4 inclusive of the drawings, I locate a hollow cylindrical core A, within the ends of the tire, which are abutted against each other. This core may be formed of any suitable material, and in any suitable manner, provided only that it is adapted to be reduced either by its destruction, or by entirely changing it in form, for its removal from the tire after the same has been molded and vulcanized. Preferably, and as herein shown, I form it of a long strip of fabric saturated with rubber so as to be sufficiently adherent to hold together, but yielding under some force, to permit the removal of the core in the form of a tape, as will be described later on.

In applying the core, I by preference cement it in one end of the tire, so that half of it protrudes therefrom. Then when the cement is dry, the other end of the tire is drawn over the protruding half of the core, and cemented thereto. The core is thus fixed within the joint formed by the abutment of the ends of the tire against each other. The abutting ends of the tire are now bound onto the core by means of a binding strip B, for which fabric saturated with rubber may be employed. I have spoken of the abutting ends of the tire, and desire now to explain that the ends of the tire in its full thickness are not so abutted, but that preparatory to forming the joint, the outer layers of the tire are removed from its ends, leaving only its inner layers C C' for abutment. The inner layer C, I will assume to be of pure rubber, and the layer C' of strong fabric saturated with rubber. Then after the core has been inserted into the reduced ends of the tire, as described, and the binding strip B applied, the reduced ends of the tire are built up to the full thickness of the remaining portions thereof, by layers or bands C², and C³, of which I will suppose the former to be fabric saturated with rubber, and the latter to be sheet-rubber. It will be noticed that the layer C³, breaks joints with the layer C². I do not wish to be understood as at all confining myself to forming the joint, or building up the tire as described, for the number of layers in it, and their character and disposition, may be greatly varied, but my description will serve to illustrate in a general way, my improved method.

After the core has been inserted into the reduced ends of the tire, and the same built up to the full thickness of the other portions of the tire, the tire is placed within a suitable mold, such for instance as the two-part mold a a, shown by Fig. 2 of the drawings, and subjected to internal pressure, fluid pressure being generally employed. When in the mold, the walls thereof co-operate with the core to subject the joint of the tire to mechanical compression, the abutting ends and overlapping layers of the tire being pinched, as it were, between the walls of the mold and the periphery of the core. This reduces and shapes the said portions of the tire, and makes them conform in thickness to the other portions thereof. Under the methods heretofore practiced, this could not be done, because without a core within the joint, it was impossible to subject the same to such compression, and for this reason, tires as heretofore made have been unequal in thickness at their joints and clumsy, and they have been objectionable on that account, particularly when employed for removable inner air tubes, which demand for their best operation tires without internal obstructions, and of uniform internal diameter.

If the core should be formed of a material absorbent of water, it would take up a little of the water used for subjecting the tire to internal pressure, and being consequently enlarged or swollen, subject the joint to additional compression. The core, it will be observed, pinches the material of the joint together so firmly that it is not allowed to separate under the pressure to which the tire is subjected, whereas without the core, and the walls of the tire being placed under considerable tension when being subjected to pressure, the joint will often separate, causing a leak, and the loss of the product. After the tire has been molded and vulcanized, it is removed from the mold, after which the core is removed. That may be done in a variety of ways. If the tire is to have a port or opening D, formed in its periphery for the insertion and removal of an inner air tube, the said port is formed where the joint is, so that when the tire is cut to form the port, as shown by broken lines in Fig. 2, the core is also cut, whereby it is reduced, so to speak, into a condition for removal. Fig. 3 of the drawings shows the exposure of the core consequent upon forming the port in the tire.

Fig. 4 shows the tire after the core has been removed.

Preferably I shall, preparatory to using it, dust the exterior surface of the core with powdered talc, and then wrap around it a joint-covering or transfer-strip E, of sheet-rubber, by preference, or fabric saturated with rubber. Then in introducing the core between the reduced ends of the tire, the same will be cemented to the exterior surface of the said transfer-strip, which will be left in the tire, where it will cover the joint when the core is removed, for the powdered talc applied as referred to, prevents the said strip from adhering to the periphery of the core. I do not limit myself to using this transfer-strip, but its employment is desirable.

It is obvious that in the same manner I might locate within the tire a strip of thin sheet-metal, or some material other than rubber, or fabric containing the same, the core serving to protect such a strip as well as the joint, from the action of any chemical substances used in producing internal pressure within the tire. A sheet-metal strip, or one having more rigidity than a strip of rubber or fabric saturated with rubber, would obviously augment the mechanical compression secured between the core and the mold. Furthermore, it is conceivable that I might provide the core with a stamped sheet-metal cover for the production of an impression of some character within the tire at the joint.

In Figs. 5 and 6 of the drawings, I have shown the use of my improved core in the formation of a tire which has no port formed in it through which the core may be removed bodily, as before described. I therefore provide for reducing the core by uncoiling it so that it may be drawn from the tire in the form of a long tape. Thereto, prior to introducing the core into the tire, I uncoil its inner end F, as shown by Fig. 5 of the drawings, and powder the same well with talc, so that it will not adhere to the adjacent walls of the tire. Then when the tire has been removed from the mold, I form an opening G, in it to one side of the joint, and introduce into this opening a wire rod H, by means of which I engage the free inner end of the core, after which by the rotation of the rod, the entire core may be reduced by uncoiling it, as indicated in Fig. 6 of the drawings. The opening G, may then be repaired or used for the application of the little tube by means of which the tire is inflated. This opening G, may be located at any convenient distance from the joint. If two or three inches therefrom the core may readily be reduced and withdrawn.

In Fig. 7 of the drawings I have shown how the reduced ends I I' of the tire may be tapered and lapped past each other, over a core J, made in accordance with my invention.

In Fig. 8 of the drawings, I have shown how the ends of the transfer-strip may be rolled to form little beads K K, within the tire.

Although I prefer to form the core of a coil of fabric saturated with rubber, I may employ a core of wood, cork, or other equivalent material, or, I might make a core of some material not affected by the chemicals or heat used in the process of molding and vulcanizing, but which might be reduced for removal by other chemical means in solution. Again, I might use a core constructed of some material which could be reduced for its removal from the tire, by crumbling it. I prefer, however, as elsewhere stated, to use a core composed of a long strip of fabric formed into a coil, for that enables me to utilize strips of fabric which would otherwise be wasted, and to conveniently enlarge or reduce the size of the core by adding layers to or removing layers from its surface. Furthermore such a core is advantageous because it may be made so as to be largely absorbent of the fluid used to subject the tire to internal compression, whereby additional mechanical compression of the tire between the core and the mold is secured, as before mentioned. I wish also to state that the core enables me to prevent the tire from twisting in the mold at the joint, by simple means, which consists in pins driven into the core near its ends, through the tire, and having their outer ends clamped between the members of the mold, which may, if desired, be thereto provided with shallow grooves. Such a pin L, is seen in Fig. 8 of the drawings. Under this arrangement the pins prevent the core from rotary movement in the tire, which is itself prevented from turning in the mold by the core, between which and the mold it is firmly pinched. After the tire is removed from the mold, the pins are readily withdrawn. They might be replaced by screws passed through the tire into the core after the ends of the tire have been abutted or lapped to form the joint.

I am aware that it is customary in molding tires to employ an internal sleeve of sufficient thickness to support the tire at the joint in a tubular form, but heretofore this sleeve has always been left in the tire after the completion of the same, and has formed an obstruction to the insertion and removal of an inner air-tube, and furthermore, makes the tire a little thick and clumsy at its joint, which is objectionable if the best performance of a pneumatic tire is to be aimed at.

I am well aware that it is old to place a core within a tire for the purpose of supporting the same in tubular form during the process of molding and vulcanizing, after which the tire is cut for the removal of the core, which is used over and over. That method, however, involves the radical cutting of the tire in such an extended manner as to impair it, and to require a careful closing of the cut. I do not, therefore, broadly claim the molding of a tire by the use of a core, but only the use of a core adapted by its construction to be reduced preparatory to its removal from the tire, whereby the orifice made in the tire for removing the core may be so small that the tire is practically uninjured by the formation of it.

In view of the suggestions made in the foregoing description, and of other changes which may obviously be made, I would have it understood that I do not limit myself to the construction and steps particularly set forth, but hold myself at liberty to make such changes and alterations as fairly fall within the spirit and scope of my invention.

Having fully described my invention, what I claim as new, and desire to secure by Letters Patent, is—

1. A method of forming joints in hollow articles composed of or containing rubber, consisting in placing a hollow tape core within the joint of the thing being formed, then subjecting the same to internal pressure in a mold, which co-operates with the core to place the material between them under mechanical compression, and then reducing and removing the core by unwinding it, substantially as described.

2. A method of forming joints in pneumatic cycle tires or other hollow articles formed of or containing rubber, consisting in placing a hollow tape core furnished upon its periphery with a transfer strip, within the ends to be joined, which are secured to the said transfer strip, then subjecting the article to internal pressure in a mold which co-operates with the core to place the material between them under mechanical compression, then forming an opening in the tire, and reducing the core by unwinding it and removing it through the said opening, leaving the transfer strip covering the joint within the tire, substantially as described.

In testimony whereof I have signed this specification in the presence of two subscribing witnesses.

CHARLES E. W. WOODWARD.

Witnesses:
ETHAN E. COX,
LUTHER WHITE.